US006819085B2

United States Patent
Kimoto

(12) United States Patent
Kimoto

(10) Patent No.: US 6,819,085 B2
(45) Date of Patent: Nov. 16, 2004

(54) BATTERY PACK APPARATUS

(75) Inventor: Shinya Kimoto, Toyohashi (JP)

(73) Assignee: Panasonic EV Energy Co., Ltd., Kosai (JP)

( * ) Notice: Subject to any disclaimer, the term of this patent is extended or adjusted under 35 U.S.C. 154(b) by 0 days.

(21) Appl. No.: 10/806,285

(22) Filed: Mar. 23, 2004

(65) Prior Publication Data
US 2004/0189260 A1 Sep. 30, 2004

(30) Foreign Application Priority Data
Mar. 26, 2003 (JP) ........................ 2003-085778

(51) Int. Cl.[7] .............................................. H02J 7/00
(52) U.S. Cl. ..................................................... 320/150
(58) Field of Search ........................................ 320/150

(56) References Cited

U.S. PATENT DOCUMENTS 6,504,342 B2 * 1/2003 Inui et al. ................... 320/112
6,709,783 B2    3/2004 Ogata et al. ................ 429/120
6,759,832 B2 * 7/2004 Minamiura et al. ......... 320/150

2003/0211384 A1  11/2003 Hamada et al. ............. 429/120
2004/0004461 A1   1/2004 Hamada et al. ............. 320/112

FOREIGN PATENT DOCUMENTS

JP    2001-102099    4/2001
JP    2001-167803    6/2001

* cited by examiner

Primary Examiner—Pia Tibbits
(74) Attorney, Agent, or Firm—Greenblum & Bernstein, P.L.C.

(57) ABSTRACT

A battery pack apparatus including: a plurality of battery packs each having a plurality of rechargeable batteries arranged in parallel, with a cooling medium passage interposed therebetween; a plurality of cooling medium feeding devices provided, one for each of the battery packs for feeding a cooling medium through the cooling medium passage of the battery pack; a temperature detector for detecting temperature of the rechargeable batteries in the respective battery packs; and a controller for controlling the cooling medium feeding devices based on detected temperatures, wherein the controller controls the cooling medium feeding devices such that the maximum or minimum temperatures detected for the respective battery packs substantially match with each other, to thereby inhibit the temperature variation among the rechargeable batteries.

3 Claims, 3 Drawing Sheets

BATTERY PACK APPARATUS

The present disclosure relates to subject matter contained in priority Japanese Patent Application No. 2003-85778, filed on Mar. 26, 2003, the contents of which is herein expressly incorporated by reference in its entirety.

BACKGROUND OF THE INVENTION

1. Field of the Invention

The present invention relates to a battery pack apparatus including a battery pack having a plurality of rechargeable batteries and a cooling medium feeding device for feeding a cooling medium through a cooling medium passage disposed between the rechargeable batteries, and capable of inhibiting temperature variations among the rechargeable batteries.

2. Description of the Related Art

In a battery pack composed of a plurality of rechargeable batteries, the temperature in the rechargeable batteries rises due to heat generation caused by charge and discharge of the batteries, which induces decrease of the battery output, the charge/discharge efficiency, and the battery lifetime. To cope with such problem, it has been conventionally known that a battery pack apparatus is constructed by providing a cooling medium passage between rechargeable batteries and providing a device for feeding a cooling medium through the cooling medium passage (see Japanese Patent Laid-Open Publication No. 2001-167803, for example).

It has been known that, for the purpose of obtaining a desired battery output, as shown in FIG. 4, a battery pack apparatus 31 is constructed by combining a first battery pack 33 composed of a predetermined number of rechargeable batteries 32 and a second battery pack 34 composed of a different number of rechargeable batteries 32 from the first battery pack 33, and serially connecting these battery packs 33 and 34. In the battery pack apparatus thus constructed, there are provided separate cooling medium feeding devices 35 and 36 for the respective battery packs 33 and 34 so that desired combination of battery packs can be provided easily.

It has been also known that, for the purpose of cooling a plurality of battery packs uniformly, the plurality of battery packs are respectively disposed in cooling medium passages, the air exhaust openings of the cooling medium passages being opened to an exhaust collector chamber, and an exhaust duct having a single exhaust fan is connected to the downstream of the exhaust collector chamber so that uniform cooling is achieved by the single exhaust fan (see Japanese Patent Laid-Open Publication No. 2001-102099, for example).

When a plurality of battery packs 33 and 34 are combined to construct a battery pack apparatus 31 as shown in FIG. 4, the construction is made such that the temperature variations among rechargeable batteries 32 in each of the battery packs 33, 34 is restrained within a predetermined range, and the temperature variations in the battery packs 33, 34 will be contained in the ranges of td1 and td2 as shown in FIG. 5. However, since the two battery packs 33 and 34 are different in the number of rechargeable batteries 32, in the feeding characteristic of the cooling medium feeding devices 35 and 36, and in the temperature of the cooling medium, there occurs temperature variation between the battery packs 33 and 34 and the temperature variation in the battery pack apparatus 31 as a whole becomes large as shown by Td in FIG. 5. This will adversely affect the output characteristic and lifetime of the battery pack apparatus 31. It is true that in the respective battery packs 33 and 34 the cooling medium feeding devices 35 and 36 are controlled such that the temperature of the rechargeable batteries 32 will not exceed a predetermined value and thus the final maximum temperatures of the battery packs 33, 34 are restrained at a substantially same level. However, since the temperature history during the change of temperature is different between the two battery packs, the foregoing problem has not been solved.

Also, in the constitution disclosed in Japanese Patent Laid-Open Publication No. 2001-102099, since a single cooling medium feeding device is provided for several battery packs, it is not possible to constitute a battery pack apparatus with a desired battery output simply by combining a plurality of battery packs each composed of an appropriate number of rechargeable batteries. Moreover, if each battery pack is composed of a different number of rechargeable batteries from the other, uniform cooling among the battery packs will be impossible.

SUMMARY OF THE INVENTION

The present invention is devised in light of the aforementioned problem of the related art. An object of the present invention is to provide a battery pack apparatus capable of providing a desired battery output by combining a plurality of battery packs and still capable of inhibiting temperature variations among rechargeable batteries.

A battery pack apparatus of the present invention includes: a plurality of battery packs each having a plurality of rechargeable batteries arranged in parallel, with a cooling medium passage interposed therebetween; a plurality of cooling medium feeding devices provided, one for each of the battery packs for feeding a cooling medium through the cooling medium passage in the battery pack; a temperature detector for detecting temperatures of the rechargeable batteries in the respective battery packs; and a controller for controlling the cooling medium feeding devices based on detected temperatures, wherein the controller controls the cooling medium feeding devices such that the maximum or minimum temperatures detected for the respective battery packs substantially match with each other. According to the present invention, the number of rechargeable batteries can be adjusted to obtain a desired battery output, simply by combining a plurality of battery packs each having an appropriate number of rechargeable batteries. Further, temperature variation among the rechargeable batteries is inhibited by controlling the cooling medium feeding devices for the respective battery packs such that the maximum or minimum temperatures of the battery packs substantially match with each other.

Also, a battery pack apparatus according to the invention includes: a plurality of battery packs each having a plurality of rechargeable batteries arranged in parallel, with a cooling medium passage interposed therebetween; a plurality of cooling medium feeding devices provided, one for each of the battery packs for feeding a cooling medium through the cooling medium passage in the battery pack; a temperature detector for detecting temperatures of the rechargeable batteries in each of the battery packs; and a controller for controlling the cooling medium feeding devices based on detected temperatures. In this battery pack apparatus, temperature variation among the rechargeable batteries is inhibited without requiring complicated control operations, by setting the flow characteristic of the cooling medium in the cooling medium feeding devices for the respective battery packs such that when one of the battery packs exhibits the largest temperature distribution range, the temperature distribution ranges of the other battery packs are contained in that largest temperature distribution range.

It is preferable to set the flow resistances of passages for feeding and discharging the cooling medium in the cooling medium feeding devices such that the flow rates of the cooling medium in the cooling medium passages in the respective battery packs are substantially the same as each other.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Now, an embodiment of a battery pack apparatus according to the invention will be described with reference to FIGS. 1 and 2.

Figure 1:
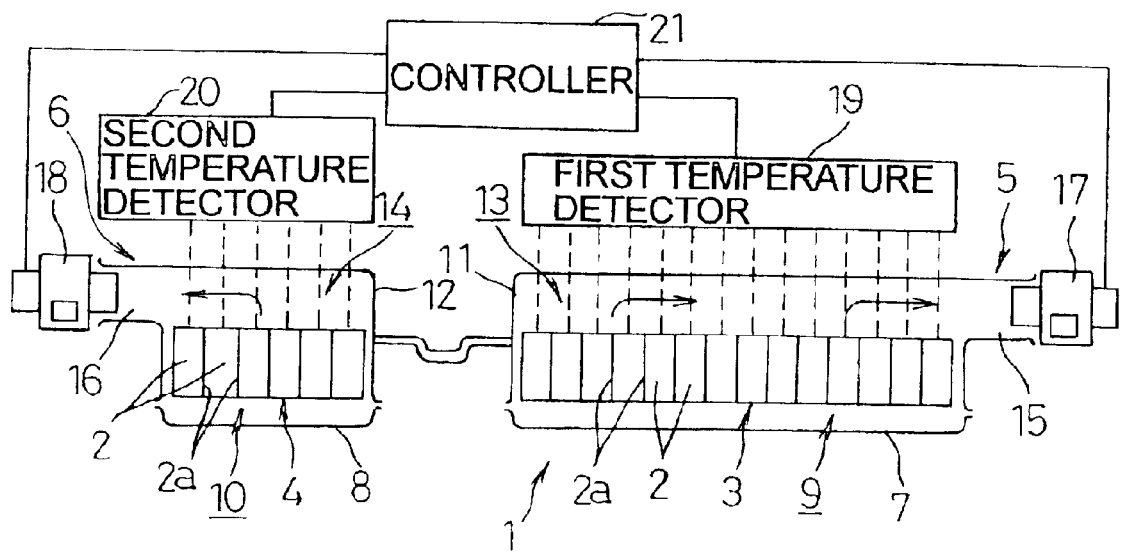
FIG. 1 is a block diagram showing a battery pack apparatus according to an embodiment of the present invention.
Figure 2:
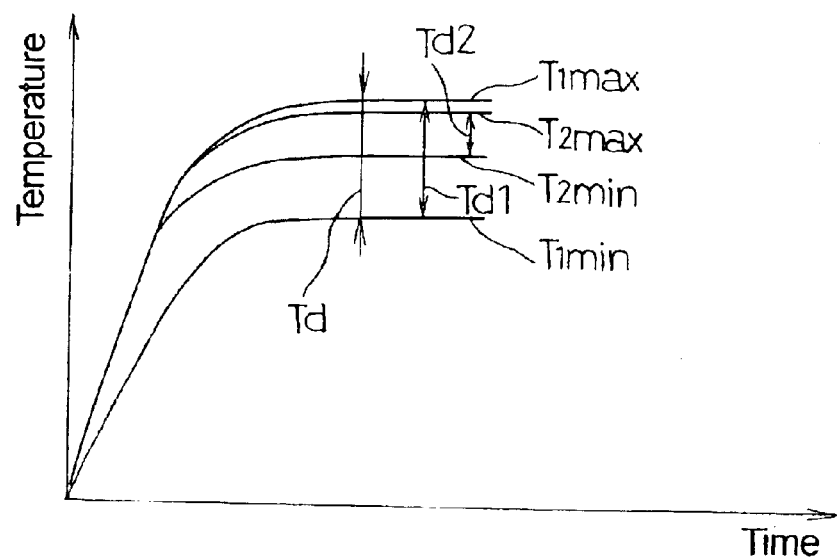
FIG. 2 is an illustration showing the temperature distribution ranges in each battery pack according to the embodiment.

In FIG. 1, a battery pack apparatus 1 serves as a drive power source for an electric vehicle including hybrid vehicles. The battery pack apparatus 1 is constructed by combining a first battery pack 3 having a predetermined number (14 in the example shown) of rechargeable batteries 2 and a second battery pack 4 having a predetermined number, different from the first battery pack 3, (6 in the example shown) of rechargeable batteries 2 and by connecting these battery packs 3 and 4 in series. The first and second battery packs 3 and 4 are provided with first and second cooling medium feeding devices 5 and 6 respectively so as to each constitute a separate unit.

In each battery pack 3, 4, flat prismatic rechargeable batteries 2 are arranged in parallel such that the long side faces of the batteries face each other with a cooling medium passage 2a interposed therebetween. A pair of end plates (not shown) are arranged on the opposite ends of the row of rechargeable batteries in the aligning direction to hold them and they are fixed as a unit by a binding member (not shown). Each rechargeable battery 2 is constructed as a battery module in which a plurality of cells (not shown) are arranged in parallel along the longitudinal direction of the long side face and are serially connected inside the module and terminals are provided to project from the opposite ends of the module for connection with the outside.

The battery packs 3 and 4 are supported respectively by lower cases 7 and 8, in which feeding passages 9 and 10 are formed for feeding a cooling medium to the bottom face of the battery packs 3 and 4. The tops of the battery packs 3 and 4 are respectively covered with upper cases 11 and 12, in which exhaust passages 13 and 14 are formed for collecting and discharging the cooling medium that has passed through the cooling medium passages 2a between the rechargeable batteries 2. Exhaust ducts 15 and 16 are respectively connected to the exhaust passages 13 and 14 and are provided with exhaust fans 17 and 18, respectively. Cooling medium feeding devices 5 and 6 are thus constituted by the feeding passages 9 and 10, the exhaust passages 13 and 14, the exhaust ducts 15 and 16, and the exhaust fans 17 and 18, respectively.

Further, first and second temperature detectors 19 and 20 are provided for detecting temperatures of the rechargeable batteries 2 in the first and second battery packs 3 and 4. Maximum temperatures $T_{1max}$ and $T_{2max}$ and minimum temperatures $T_{1max}$ and $T_{2min}$ of the rechargeable batteries 2 in the first and second battery packs 3 and 4 are determined and output to a controller 21 by these temperature detectors 19 and 20. The controller 21 is constructed to drive the exhaust fans 17 and 18 so as to match the maximum temperatures $T_{1max}$ and $T_{2max}$ in the first and second battery packs 3 and 4, as shown in FIG. 2. The exhaust fans 17 and 18 may also be driven so as to substantially match the minimum temperatures $T_{1min}$ and $T_{1min}$.

According to the foregoing constitution in which a battery pack apparatus 1 is constructed by combining first and second battery packs 3 and 4 each having an appropriate number of rechargeable batteries 2, it is made possible to adjust the number of rechargeable batteries 2 easily for obtaining a desired battery output. Further, by controlling the cooling medium feeding devices 5 and 6 of the battery packs 3 and 4 so as to substantially match the maximum temperatures $T_{1max}$ and $T_{2max}$ or minimum temperatures $T_{1min}$ and $T_{2min}$ of the battery packs 3 and 4, as shown in FIG. 2, temperature distribution Td1 of the first battery pack 3 and temperature distribution Td2 of the second battery pack 4 are made to overlap with each other, and temperature distribution Td among the rechargeable batteries 2 of the entire battery pack apparatus 1 is contained in the temperature distribution range Td1 of the first battery pack 3, that is larger than the temperature distribution Td2 of the second battery pack 4. The temperature variation is thus inhibited, and hence the decrease of output characteristics of the battery pack apparatus 1 is inhibited and the lifetime of the battery pack apparatus 1 is improved.

In the foregoing embodiment, the exhaust fans 17 and 18 of the first and second cooling medium feeding devices 5 and 6 are driven by the controller 21 so as to make the temperature distribution ranges in the battery packs 3 and 4 to overlap with each other. However, the exhaust fans 17 and 18 can be controlled independently by a controller, in a similar manner to the conventional battery pack apparatus, based on temperatures detected by the first and second temperature detectors 19 and 20, and meanwhile the flow characteristics of the cooling medium in the first and second battery packs 3 and 4 can be set appropriately such that the temperature distribution range Td2 of the second battery pack 4 is contained in the larger temperature distribution range Td1 of the first battery pack 3.

Figure 3:
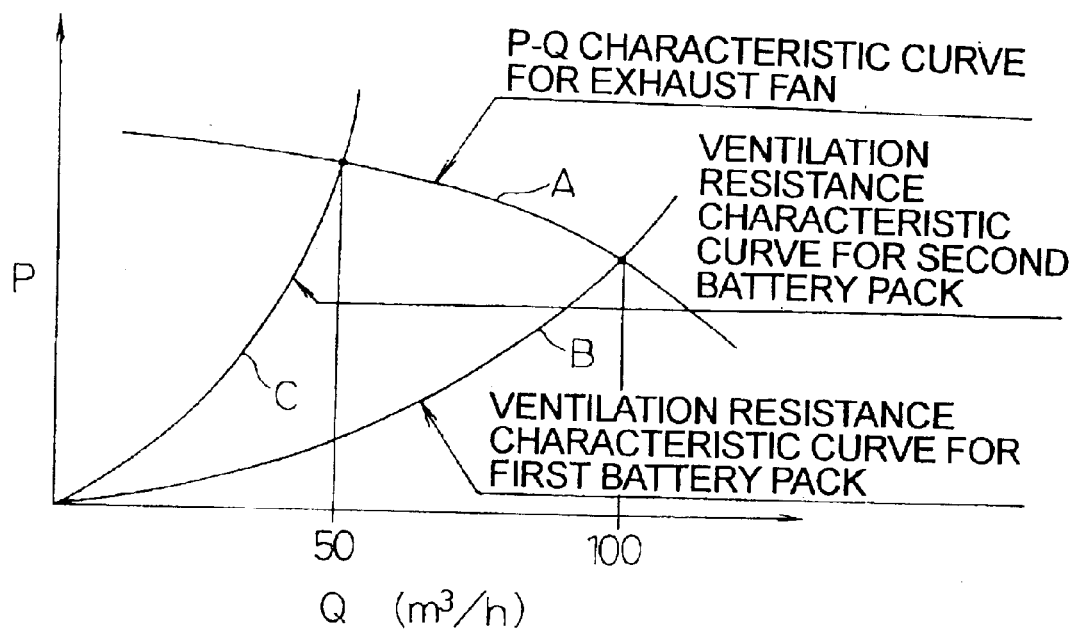
FIG. 3 is an illustration showing the relationship between characteristics of an exhaust fan and ventilation resistance characteristics of cooling medium feeding devices for first and second battery packs of a battery pack apparatus according to another embodiment of the invention.
Figure 4:
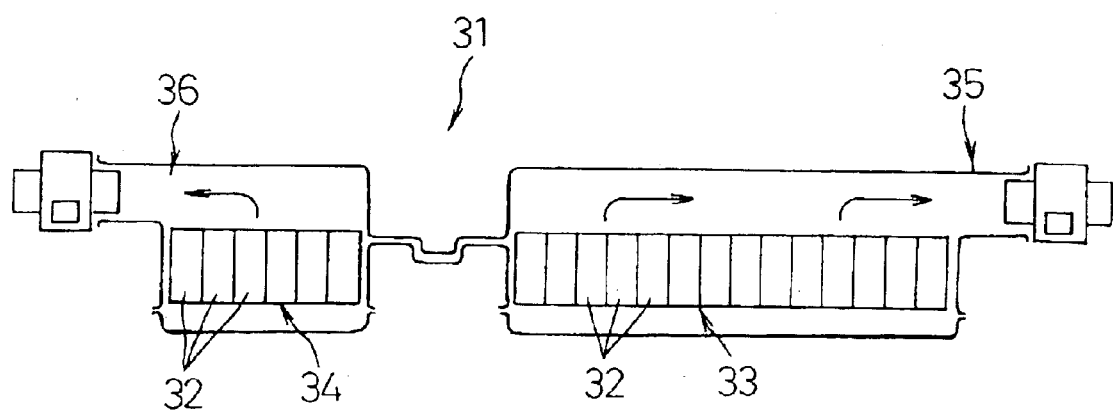
FIG. 4 is a block diagram showing a conventional battery pack apparatus.
Figure 5:
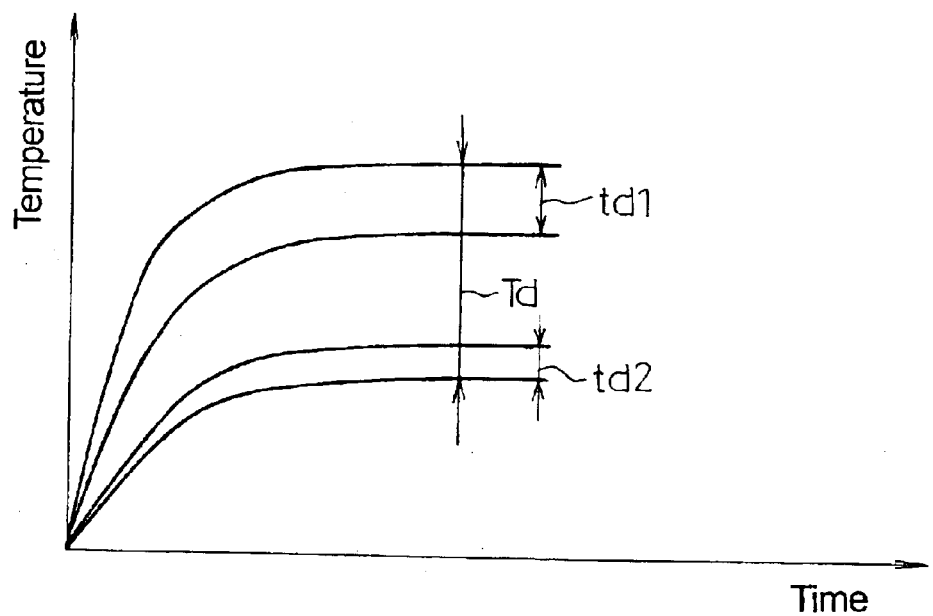
FIG. 5 is an illustration showing the temperature distribution ranges in the conventional battery pack apparatus.

More specifically, as shown in FIG. 3, for example in a case where a first battery pack includes ten rechargeable batteries 2 and a second battery pack includes a half of ten, namely five rechargeable batteries 2, the construction is made such that the ratio of the flow rate Q1 (e.g. 100 m³/h) to the flow rate Q2 (e.g. 50 m³/h) is 2 to 1 wherein the flow rate Q1 is determined at the intersection between the P-Q (pressure versus flow rate) characteristic curve A for the exhaust fans 17, 18 and the ventilation resistance characteristic curve B for the cooling medium feeding device 5 of the first battery pack, and the flow rate Q2 is determined at the intersection between the P-Q characteristic curve A and the ventilation resistance characteristic curve C for the cooling medium feeding device 6 of the second battery pack. Thus, the battery pack apparatus is constructed such that the cooling medium flow rate per rechargeable battery 2 in the first battery pack is equal to that in the second battery pack. Thereby, the temperature distribution range in the first battery pack is made to overlap with the temperature distribution range in the second battery pack.

According to such constitution, temperature variation among the rechargeable batteries 2 in both the battery packs is inhibited without requiring complicated control operations.

Although the foregoing description of the embodiment has only disclosed an example of connecting a plurality of battery packs in series, a plurality of battery packs can be connected in parallel or can be connected in series-parallel.

With the battery pack apparatus of the present invention, a desired battery output is obtained by simply combining a plurality of battery packs each having an appropriate number of rechargeable batteries, and moreover temperature variation among the rechargeable batteries is inhibited by controlling the drive of cooling medium feeding devices for respective battery packs so as to substantially match the maximum or minimum temperatures of the battery packs. Thereby, the deterioration of output characteristics of the battery pack apparatus is inhibited and the lifetime of the battery pack apparatus is improved.

Also, by setting the flow characteristic of the cooling medium in the cooling medium feeding device for each of the battery packs such that when one of the battery packs exhibits the largest temperature distribution range, temperature distribution ranges of the other battery packs are contained in that largest temperature distribution range, temperature variation among the rechargeable batteries is inhibited without any complicated control operation.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack apparatus, comprising:
   a plurality of battery packs each having a plurality of rechargeable batteries arranged in parallel, with a cooling medium passage interposed therebetween;
   a plurality of cooling medium feeding devices provided, one for each of the battery packs for feeding a cooling medium through the cooling medium passage in the battery pack;
   a temperature detector for detecting temperatures of the rechargeable batteries in the respective battery packs; and
   a controller for controlling the cooling medium feeding devices based on detected temperatures, wherein
   the controller controls the cooling medium feeding devices such that one of maximum and minimum temperatures detected for the respective battery packs substantially match each other.

2. The battery pack apparatus of claim 1, wherein:
   flow characteristics of the cooling medium in the cooling medium feeding devices for the respective battery packs are set such that a temperature distribution range of each battery pack is contained in a largest temperature distribution range of any of the battery packs.

3. The battery pack apparatus according to claim 2, wherein
   flow resistances of passages for feeding and discharging the cooling medium in the cooling medium feeding devices are set such that flow rates of the cooling medium in each of the cooling medium passages in the respective battery packs substantially match each other.

* * * * *